United States Patent
Pasoz

(10) Patent No.: US 9,580,336 B2
(45) Date of Patent: Feb. 28, 2017

(54) SYSTEM FOR REMOVAL OF CONTAMINANTS IN WATER

(71) Applicant: Louis Pasoz, San Clemente, CA (US)

(72) Inventor: Louis Pasoz, San Clemente, CA (US)

( * ) Notice: Subject to any disclaimer, the term of this patent is extended or adjusted under 35 U.S.C. 154(b) by 155 days.

(21) Appl. No.: 14/533,139

(22) Filed: Nov. 5, 2014

(65) Prior Publication Data

US 2015/0129480 A1     May 14, 2015

Related U.S. Application Data

(60) Provisional application No. 61/902,817, filed on Nov. 12, 2013.

(51) Int. Cl.

| | | |
|---|---|---|
| *E02B 15/04* | (2006.01) | |
| *C02F 1/40* | (2006.01) | |
| *E02B 15/10* | (2006.01) | |
| *E04H 4/12* | (2006.01) | |
| *B01D 21/00* | (2006.01) | |
| *C02F 103/00* | (2006.01) | |
| *C02F 1/24* | (2006.01) | |
| *C02F 101/32* | (2006.01) | |
| *B01D 21/24* | (2006.01) | |
| *B01D 21/30* | (2006.01) | |

(52) U.S. Cl.
CPC .............. *C02F 1/40* (2013.01); *B01D 21/0027* (2013.01); *E02B 15/04* (2013.01); *E02B 15/10* (2013.01); *E02B 15/106* (2013.01); *E04H 4/1218* (2013.01); *E04H 4/1263* (2013.01); *B01D 21/2433* (2013.01); *B01D 21/307* (2013.01); *C02F 1/24* (2013.01); *C02F 2101/32* (2013.01); *C02F 2103/007* (2013.01); *C02F 2201/002* (2013.01)

(58) Field of Classification Search
CPC ........ E02B 15/04; E02B 15/10; E02B 15/106; E04H 4/1218; E04H 4/1263; E04H 4/16; B01D 21/0027; B01D 21/2433
USPC ... 210/167.1, 167.18, 170.05, 170.09, 170.1, 210/170.11, 242.1; 4/490, 496
See application file for complete search history.

(56) References Cited

U.S. PATENT DOCUMENTS

| | | | | |
|---|---|---|---|---|
| 4,405,458 A | * | 9/1983 | McHugh, Jr. | E02B 15/106 210/242.1 |
| 4,601,833 A | * | 7/1986 | Shubert | B01D 21/2433 210/242.1 |
| 4,802,592 A | * | 2/1989 | Wessels | B01D 21/2433 210/242.1 |

(Continued)

*Primary Examiner* — Christopher Upton
(74) *Attorney, Agent, or Firm* — Eleanor Musick; Musick Davison LLP

(57) ABSTRACT

An apparatus for removal of contaminants from water includes an openable enclosure with one or more inlet openings through the sides for admitting water and debris into the enclosure. Intake modules attached to the outer surface of the enclosure draw water from the enclosure through an intake conduit and out an upper port in the side of the intake module. A pump module adjacent to the intake module has a side port corresponding to the upper port of the intake module so that water is drawn by a pump from the intake module and exhausted through an outlet channel of the pump module. A snorkel attached to the pump module with its lower end located adjacent to the pump propeller draws air down into the snorkel and into a fitting disposed below the pump propeller for injection into the enclosure.

18 Claims, 4 Drawing Sheets

(56) References Cited

U.S. PATENT DOCUMENTS

| | | | | |
|---|---|---|---|---|
| 5,078,863 A | * | 1/1992 | Durigon | E04H 4/1263 210/167.19 |
| 5,439,600 A | * | 8/1995 | Pasoz | E04H 4/1218 210/170.09 |
| 5,498,348 A | * | 3/1996 | Plink | E04H 4/1263 210/242.1 |
| 6,054,045 A | * | 4/2000 | Wittstock | B01D 21/0012 210/170.09 |
| 6,274,047 B1 | * | 8/2001 | Bates | E02B 15/106 210/170.05 |
| 2004/0256300 A1 | * | 12/2004 | Braun | E04H 4/1218 210/167.12 |
| 2005/0092668 A1 | * | 5/2005 | Desjoyaux | E04H 4/1218 4/490 |
| 2008/0217229 A1 | * | 9/2008 | Wagner | E04H 4/1263 210/170.05 |

* cited by examiner

SYSTEM FOR REMOVAL OF CONTAMINANTS IN WATER

RELATED APPLICATIONS

This application claims the benefit of the priority of U.S. Provisional Application No. 61/902,817, filed Nov. 12, 2013.

BACKGROUND OF THE INVENTION

Bodies of water near populated areas are commonly subject to pollution from both chemical and solid waste. Considerable effort has been addressed to the removal of oil slicks or other chemical films that float on the water surface. Among such efforts are the floating weirs of McHugh, Jr. (U.S. Pat. No. 4,405,458 issued Sep. 20, 1983) and Wessels (U.S. Pat. No. 4,802,592 issued Feb. 7, 1989). Both of these systems are remote from the pumping unit, being connected by a suction hose, and are similar to well-known pool cleaners. Another system is that of Shubert (U.S. Pat. No. 4,601,833, issued Jul. 22, 1986) which is a floating trough for removal of effluent fluid at a predetermined level beneath the surface of the water. While advances have been addressed to liquid separation, solid waste is still primarily dealt with by manually collecting the debris with nets.

Solid waste and chemical contaminants in bodies of water are frequently found in marinas and harbors, where natural flow patterns are modified by floating docks and pilings. Carelessly discarded paper and plastic containers and wrappings fall into water from boats or are blown into the water from land. Fuels, oil, and maintenance materials (cleaning solutions, solvents, etc.) used on boats are not adequately contained during and contaminate the water. Run-off from roads and parking lots from irrigation or rain create oil slicks in nearby water. Collectively, these materials pollute the water and degrade quality and aesthetics of the water.

U.S. Pat. No. 5,439,600 to the present inventor disclosed a floating apparatus that could be attached to a dock or floating platform to draw pelagic contaminants into a collection basket where it would be retained for periodic removal. While the device was highly effective in removing materials such as plastics, bottles, paper, oil sheen, and driftwood from marinas, it occasionally experienced difficulties handling large plastic bags because they tended to clog the pump, which was located at the bottom of the enclosure. In addition, the large amounts of trash could become so compacted that the pump would clog. One attempted solution involved moving the pump away from the center bottom of the enclosure and the use of hoses to direct the pump suction to the center bottom, underneath a grating that captured the debris. This approach experienced problems when marine life (barnacles, chitons, tube worms, etc.) accumulated in the hoses, again clogging the suction path.

Accordingly, the need exists for an effective system for removal of pelagic contaminants from bodies of water that does not suffer the drawbacks of its predecessors.

BRIEF SUMMARY

In an exemplary embodiment, the apparatus for removal of contaminants from water comprises an enclosure with an openable top and at least one inlet near the top, for admitting water into the interior of the enclosure, at least one bottom port near a bottom of the enclosure, an intake module having a lower portion with an conduit for connection to the at least one bottom port and an upper port on a first side of the intake module, a pump module attached to an outer surface of the enclosure adjacent to the at least one intake module, the pump module having a side port corresponding to the upper port of the at least one intake module so that the pump module and the at least one intake module are in fluid communication, the pump module further comprising an outlet channel. A pump having a propeller at its bottom is supported within the pump module at a location above the outlet channel. Flotation devices are attached to the outer sides of the enclosure. A cup is positioned within the outlet channel to capture a portion of the outflow of the pump. In an exemplary embodiment, the cup captures about 20% of the water output by the pump. Tubing attached to the cup directs the captured outflow through an opening and back into the bottom of the enclosure to partially suspend the collected debris within the enclosure, reducing the chance of clogging. A snorkel is attached to the pump module so that the lower end of the snorkel is positioned close to the pump propeller. The upper end of the snorkel extends through the top of the pump module and above the surface of the water. Rotation of the pump propeller generates a vacuum to draw air down into the snorkel. The air is directed into a fitting located below the pump propeller. The fitting is connected to an opening at the bottom of the enclosure so that air is injected into the enclosure to aerate the contents of the enclosure to further prevent excessive compaction of the collected debris and to discourage attachment of barnacles, formation of algae or other build-ups within the enclosure, tubing and conduits. Brackets at the side or top of the body permit attachment to a dock or floating platform. The at least one inlet has at least one weir with a shape to create a flow differential.

The main portion of the enclosure is a generally rectangular box and may be varied in size as needed, depending upon the area of the body of water and the amount of pollution. The sides of the box may be angled to facilitate placement, to further control flow patterns, and/or to assist in supporting components of the assembly. A grating is removably positioned near the bottom of the enclosure supported at a height to provide sufficient spacing to ensure unobstructed flow for intake and outlet of water. The top may be supported at an angle to provide better access to the interior for removal of accumulated debris. In the preferred embodiment, at least one inlet opening is formed in each vertical side of the enclosure. The opening may include a weir cross-section to help direct incoming water and suspended material toward the center of the inlet opening. The lid at the top of the enclosure is openable for removing the collected debris. In one embodiment, a mesh basket may be fitted within the interior walls of the box. A grating is disposed at the bottom of the enclosure to ensure a clear path from the interior of the enclosure to the at least one inlet module. At least one flotation device may be attached to each side of the enclosure. The flotation devices may have adjustable buoyancy to allow control over the float level of the skimmer.

In one aspect of the invention, an apparatus for removal of contaminants from water includes an enclosure having sides, a bottom portion, an openable lid and at least one inlet opening through the sides near the top configured for admitting water into the interior of the enclosure; at least one intake module attached to an outer surface of the enclosure, the at least one intake module having a lower portion with an intake conduit in fluid connection with the bottom portion of the enclosure and an upper port on a first side of the intake module; a pump module attached to an outer surface of the enclosure adjacent to the at least one intake module, the pump module having a side port corresponding to the upper port of the at least one intake module so that the pump module and the at least one intake module are in fluid communication, the pump module further comprising an outlet channel; a pump having a pump propeller disposed within the pump module at a location above the outlet channel; a snorkel attached to the pump module so that a lower end of the snorkel is disposed adjacent to the pump propeller and an upper end of the snorkel extends through a top of the pump module above a surface of the water, wherein rotation of the pump propeller generates a vacuum to draw air down into the snorkel; a fitting disposed below the pump propeller, the fitting in fluid communication with the bottom of the enclosure so that air is injected into the enclosure; and a plurality of flotation devices attached to the outer surface of the enclosure. In an exemplary embodiment, two intake modules are disposed on opposite sides of the pump module. A grating may be disposed near the bottom portion of the enclosure to define a space into which the intake conduit extends. In one embodiment, a cup is disposed within the outlet channel to capture a portion of the outflow of the pump; and tubing is attached to the cup for directing the captured outflow into the bottom portion of the enclosure.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION

Figure 1:
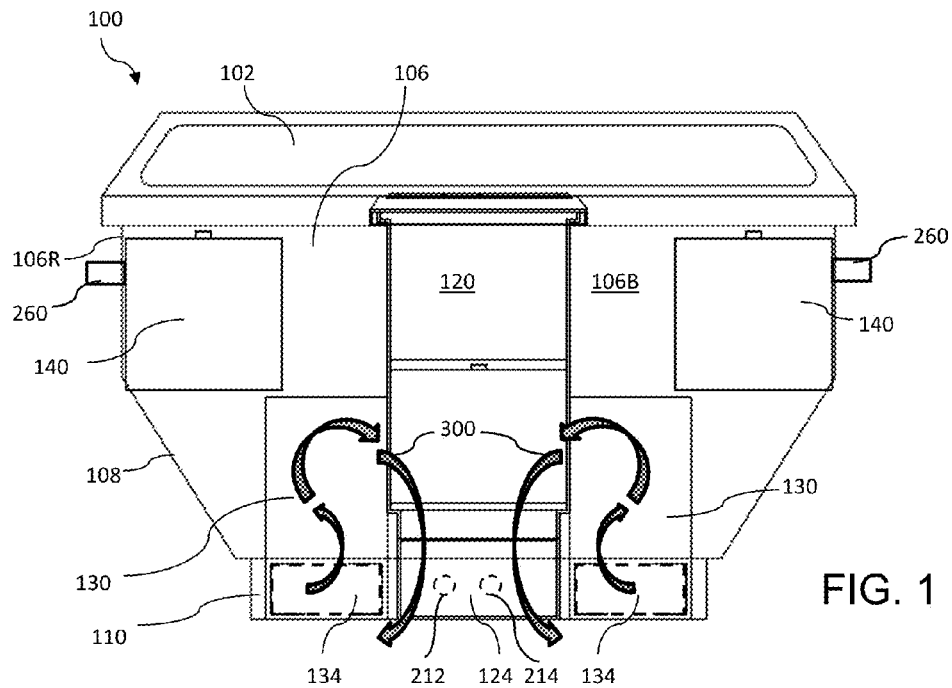
FIG. 1 is a diagrammatic rear view of an apparatus according to an embodiment of the present invention.
Figure 2:
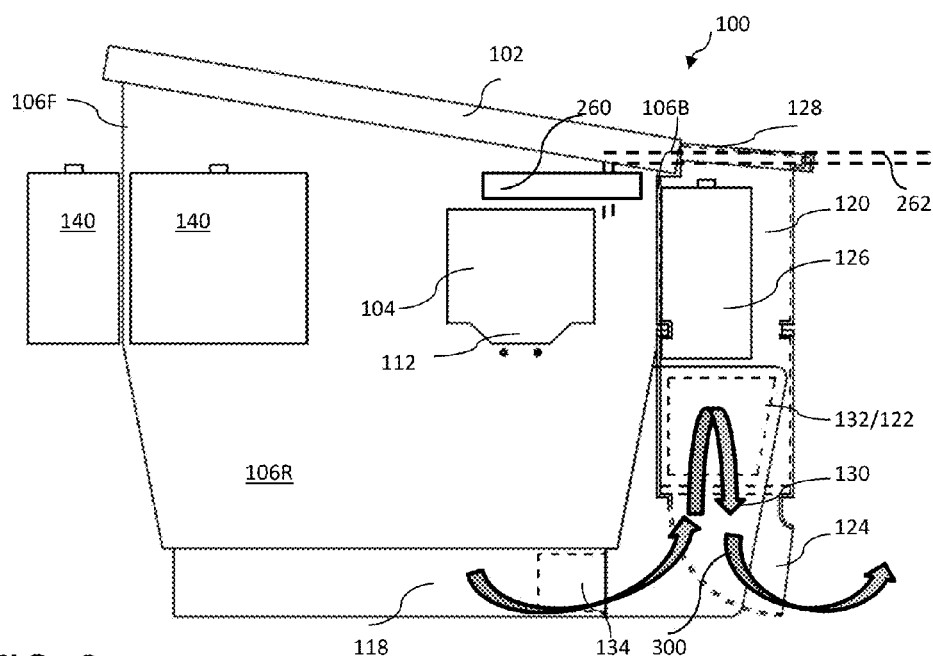
FIG. 2 is a diagrammatic side view of an embodiment of the inventive apparatus.
Figure 3:
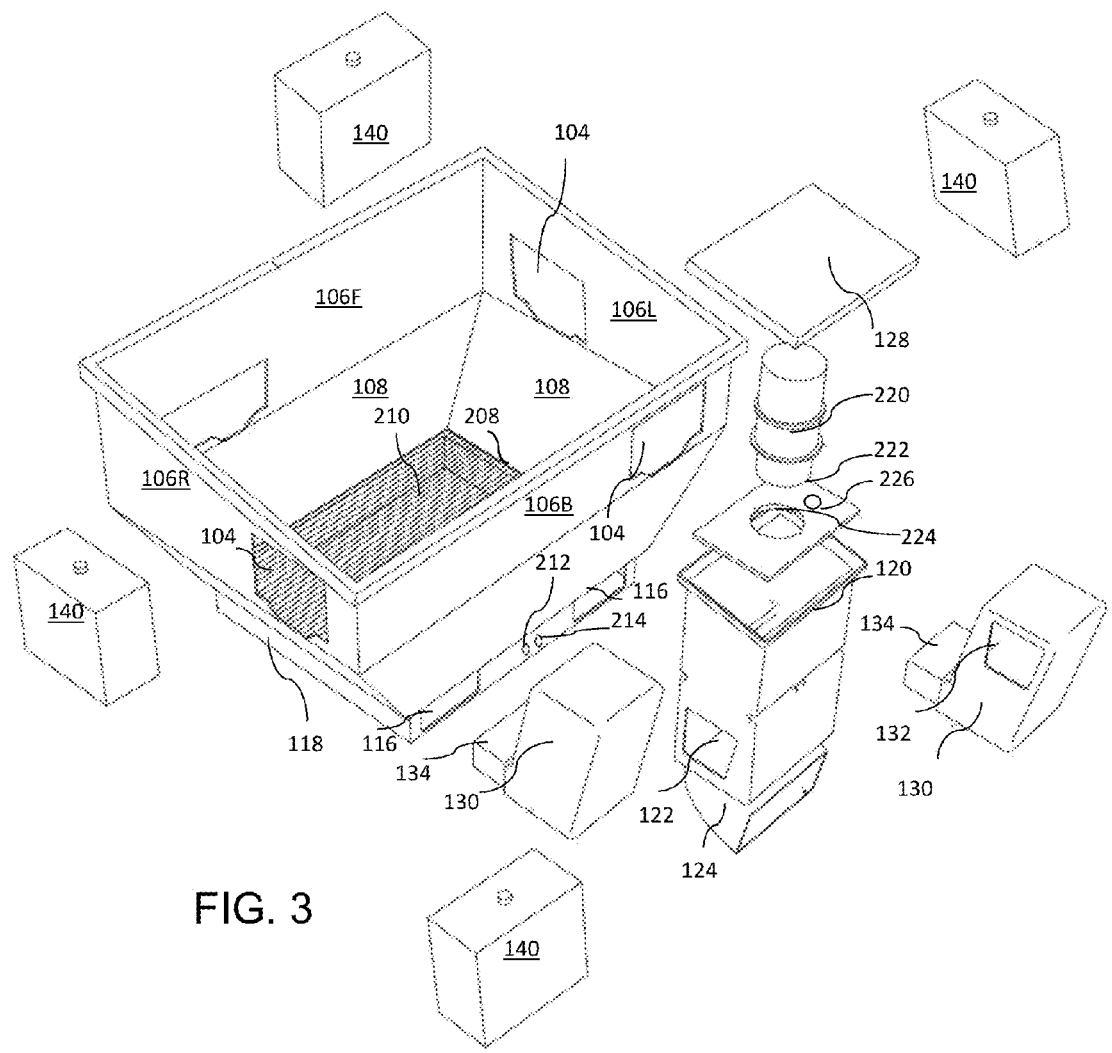
FIG. 3 is an exploded perspective view of the apparatus.

As illustrated in FIGS. 1-3, the skimmer assembly 100 for removal of contaminants from water comprises a generally rectangular enclosure 106 with an openable lid 102 and at least one inlet 104 near the top for admitting water into the interior of the enclosure. At least one intake module 130 is attached to the enclosure with a conduit 134 at its lower portion extending through an opening 116 near the bottom of the enclosure. In the illustrated embodiment, two inlet modules 130 are shown. An upper port 132 formed on one side of the intake module. A pump module 120 is attached to the outer surface of the enclosure adjacent to the intake module(s). The pump module 120 has a side port 122 that matches the upper port(s) 132 of the intake module 130 so that the pump module 120 and the intake module 130 are in fluid communication through the ports 122 and 132. The pump module 120 has an outlet channel 124 at its lower portion to direct water away from the enclosure.

The enclosure 106, inlet modules 130, pump module 120 and flotation tanks 140 may be formed from polyethylene or similar durable, corrosion resistant polymer. In an exemplary embodiment, the enclosure 106 is formed from 12 mm (0.5 in.) thick LLDPE (linear low-density polyethylene), which may be rotationally ("roto-") molded. Alternative production methods will be readily apparent to those in the art. Fasteners, metal structural supports and inserts are preferably formed from stainless steel.

Figure 8:
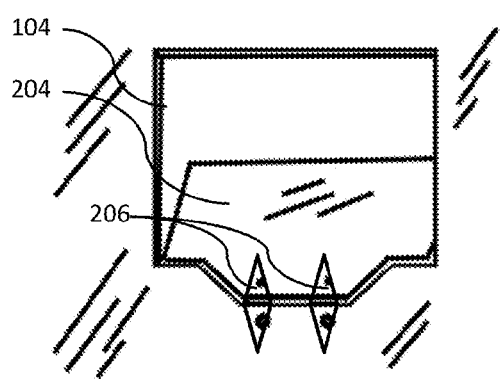
FIG. 8 is a side view of an embodiment of an inlet opening and inlet flap.

In the preferred embodiment, one inlet 104 is located in each of the vertical sides of the enclosure 106. While the enclosure 106 is generally rectangular in the exemplary embodiment, different shapes with different numbers of sides may be used to provide the best fit for the installation location. For example, the housing may be three sided, five sided or more. In some embodiments, the housing may be cylindrical, with the inlets radially distributed around the circumference of the cylinder. The size of the inlet 104 can be varied as needed. Each inlet 104 may have a weir notch 112 formed at its lower edge to create a flow differential to direct the flow of water toward the center of the inlet 104, pulling the debris toward the center of the inlet to minimize snagging of debris on the sides of the inlet. The weir configuration of the inlets also helps avoid the possible impairment of function of the system that might be caused by very large objects, such as boards or large branches. Thus, even if a large object partially spans the inlet, water will continue to flow through the weir notch. As shown in FIG. 8, an inlet flap 204 may be attached at the bottom of each inlet 104 via one or more spring-loaded hinges 206, acting as a one-way gate to help prevent debris from escaping during entry and after it enters the enclosure. As shown, flap 204 swings into the enclosure under the positive pressure of incoming water and/or debris.

Referring again to FIGS. 1-3, the upper edges of the sides 106R and 106L of the enclosure may be sloped toward the back of the enclosure to facilitate access to the interior of the enclosure when the lid 102 is opened. The lid 102 may be attached to the back of the enclosure via hinges or other attachment means (not shown) to allow the top to be opened. Alternatively, the lid 102 may be lifted off completely and set aside to permit free access to the interior volume.

The lower portions of the enclosure sidewalls 108 may be tapered inward, so that the enclosure 106 becomes narrower toward its bottom. The tapering accelerates the flow within the enclosure toward the bottom of the enclosure 106. The tapered sides 108 form a junction with the base portion 118 to define a ledge 208 within the interior of the enclosure. Grating 210 is supported on the ledge 208 to prevent debris from entering the flow volume within base portion 118. Openings 116, 212 and 214 through the back side of base portion 118 provide fluid communication between the enclosure interior and the inlet module(s) 130 and pump module 120.

In the exemplary embodiment, two intake modules 130 are attached to the back side 106B of enclosure 106. Each intake module 130 has a conduit 134 that fits closely within opening 116 to form a flow path from inlets 104 through the enclosure interior and out of the enclosure. When the pump is running, water is drawn out of the base portion 118 into conduit 134 and out through upper port 132. Upper port 132 is connected via one or more gaskets (not shown) to side port 122 of pump module 120. Both upper port 132 and side port 122 are of the same size and shape, with relatively large dimensions, to allow efficient, unrestricted flow from the base portion 118 through intake modules 130 and out the pump outlet channel 124. Arrows 300 in FIGS. 1 and 2 show the flow path from the base portion and out of the assembly. Due to the vigorous pump flow, the water level in the pump module 120 may be about 30 cm (1 foot) lower than the water level in the intake modules 120.

Figure 4:
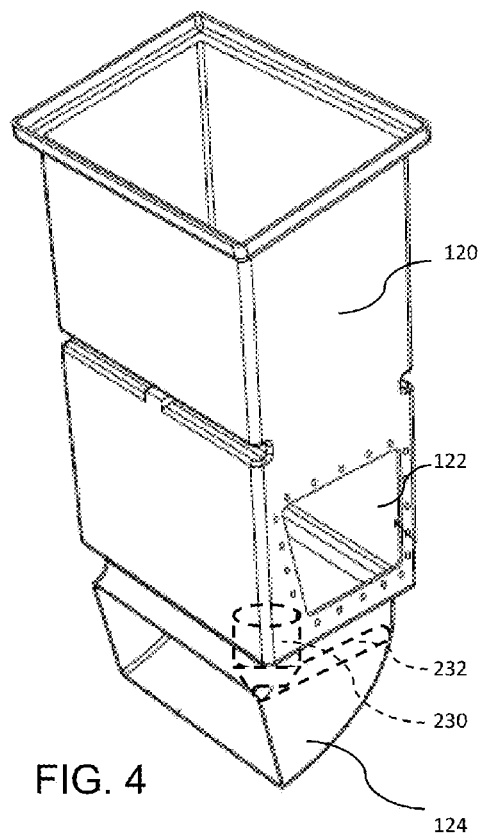
FIG. 4 is a perspective view of the pump module.
Figure 5:
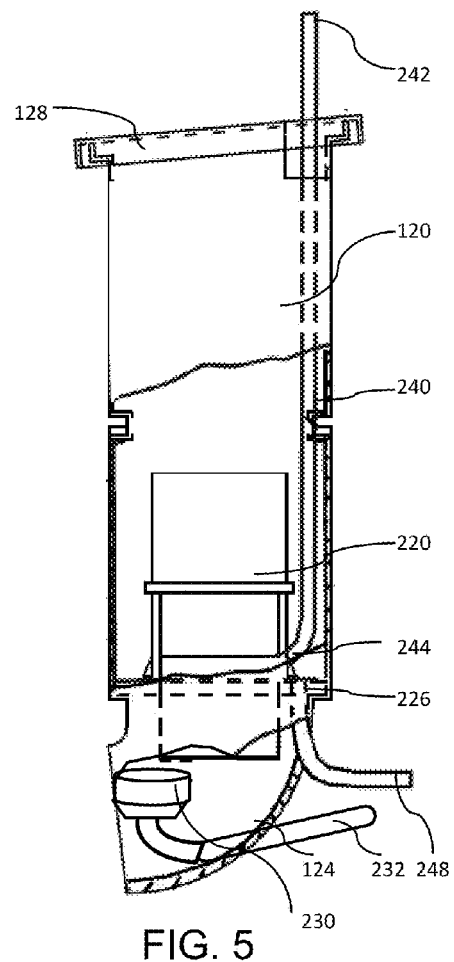
FIG. 5 is a side view of the pump module, partially cut away.
Figure 6:
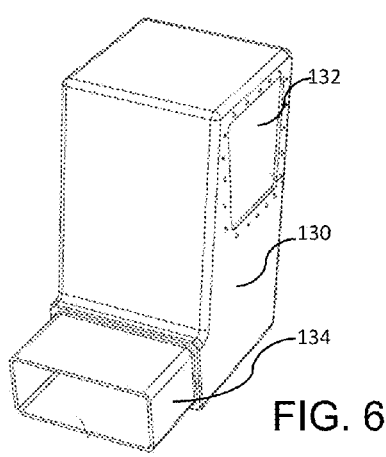
FIG. 6 is a perspective view of an inlet.

Referring to FIGS. 4 and 5, pump module 120, also attached to the back side 106B of the enclosure, separately encloses the pump 220. Pump 220, which pulls water and floating material into the enclosure, is preferably formed from a corrosion-resistant material suitable for reliable operation in harsh saltwater conditions with an environmentally-acceptable lubricant such as vegetable oil or similar materials. An exemplary pump may be a ¾ horsepower continuous-duty 120V or 230V pump with stainless steel shaft and housing. The propeller may include a renewable zinc anode for corrosion protection. A pump shelf 222 is positioned within the pump module to support the pump 220, with its propeller 228 at its lower end, at a position above the outlet channel 124. The lower portion of the pump extends through opening 226 so that the lower pump flange sits on the top of the shelf 222. The outlet channel 124 is curved to direct water away from the enclosure in a generally horizontal direction. The upper end of pump module 120 is closed by a removable lid 128 that allows access to the pump for maintenance A cup 230 is positioned within the outlet channel 124 with its open end directed upstream toward the pump 220 to capture a portion of the outflow of the pump. In an exemplary embodiment, approximately 20% of the pump outflow is captured by the cup. Tubing 232 attached near the bottom of the cup 230 directs the captured outflow through an opening in the inner side of the pump module and through port 212 in the base portion 118 of the enclosure, as shown in FIG. 1. The water flow back into the base portion 118 partially suspends the collected debris within the enclosure, reducing the chance of clogging.

Figure 7A:
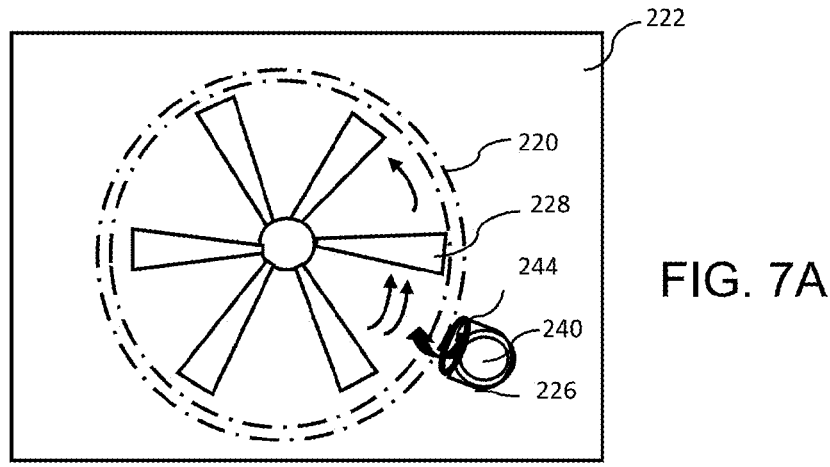
FIG. 7A is a top-down view of the pump shelf and pump, with the upper portion of the pump removed.
Figure 7B:
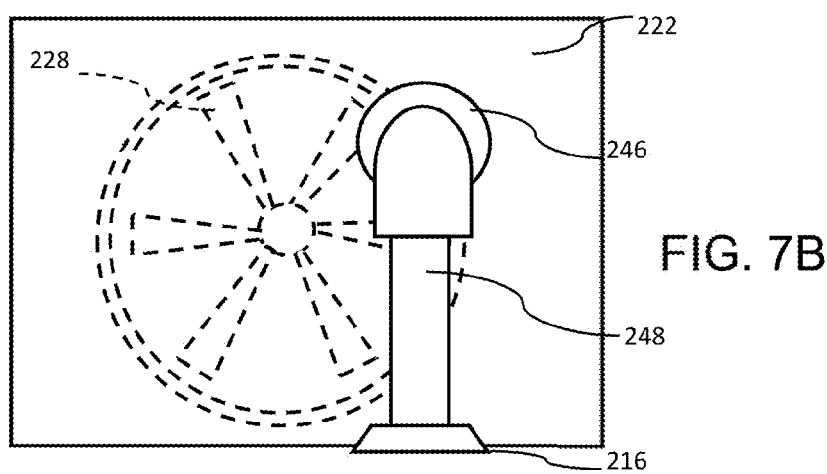
FIG. 7B is a bottom-up view of the pump shelf and pump.

Referring to FIGS. 5, 7A and 7B, a snorkel 240 is attached to the pump module so that the lower end 244 of the snorkel is positioned close to the pump propeller 228. The upper end 242 of the snorkel extends through the top 128 of the pump module and above the surface of the water. Rotation of the pump propeller 228 generates a vacuum to draw air down into the snorkel 240. The air is directed through shelf opening 226 into a fitting 246 located below the pump propeller 228. The fitting is connected via pipe 248 through a port 214 at the bottom of the enclosure so that air drawn through the snorkel 240 is injected into the base portion 118 of enclosure 106 to aerate the contents of the enclosure to further prevent excessive compaction of the collected debris and to discourage attachment of barnacles, formation of algae or other build-ups within the enclosure, tubing and conduits.

Flotation devices 140 are attached to each of the outer sides of the enclosure 106. Each flotation device 140 may include a plug 142 to allow ballast material to be added or removed to adjust the float level of the assembly in the water. Brackets 260 at the side or top of the body permit attachment to a dock or floating platform. As shown in FIG. 2, bracket 262, indicated with dashed lines, illustrates a possible attachment configuration for securing the skimmer assembly 100 to a dock, pier or other structure. As will be noted, because the assembly is self-floating, the attachment means need not be entirely rigid and may preferably allow some independent movement between the assembly and the structure to which it is attached. Other attachment means will be readily apparent to those in the art.

The frequency of the required emptying of the apparatus 100 will depend on the level of pollution in the area to be cleaned. After an initial cleanup, with the apparatus in place, the debris will be removed generally at the same rate at which it is dropped into the water, with a constant level of cleanliness being maintained.

An ideal location for installation of the apparatus is one in which debris is known to collect due to existing currents and flow patterns. For example, industrial intakes tend to draw garbage toward themselves. Water outlets and drain pipes will create their own consistent flow patterns which cause floating debris to drift in a particular repeatable direction. Flow patterns in marinas and harbors, altered by docks, pilings and other floating platforms, also tend to be repeatable and debris tends to collect in specific areas. Other locations that can benefit from installation of one or more skimmer assemblies include amusement parks that include water rides and water features, or zoos and animal parks. To maintain the aesthetics of the park, the exterior surfaces of the skimmer enclosure and lid may be modified to look like rocks or can be covered with artificial vegetation to blend into the surroundings while functioning to maintain the water in a clean, attractive condition.

It will be evident that there are additional embodiments which are not illustrated above but which are clearly within the scope and spirit of the present invention. The above description and drawings are therefore intended to be exemplary only and the scope of the invention is to be limited solely by the appended claims.

The invention claimed is:

1. An apparatus for removal of contaminants from water comprising:
    an enclosure having sides, a base portion, an openable lid and at least one inlet opening through the sides near the top configured for admitting water into the interior of the enclosure;
    at least one intake module attached to an outer surface of the enclosure, the at least one intake module having a lower portion with an intake conduit in fluid communication with the base portion of the enclosure and an upper port on a first side of the intake module;
    a grating supported above the base portion of the enclosure to define a space, the grating configured to prevent debris from entering the base portion while permitting water circulation therethrough;
    a pump module attached to an outer surface of the enclosure adjacent to the at least one intake module, the pump module having a side port corresponding to the upper port of the at least one intake module so that the pump module and the at least one intake module are in fluid communication, the pump module further comprising an outlet channel;
    a pump having a pump propeller disposed within the pump module at a location above the outlet channel; and
    a plurality of flotation devices attached to the outer surface of the enclosure.

2. The apparatus of claim 1, further comprising:
    a snorkel attached to the pump module, the snorkel having a lower end disposed adjacent the pump propeller and an upper end configured to extend above a surface of the water, wherein rotation of the pump propeller generates a vacuum to draw air into the snorkel; and
    a fitting disposed below the pump propeller, the fitting in fluid communication with the base portion of the enclosure so that air is injected into the enclosure.

3. The apparatus of claim 1, wherein the at least one intake module comprises two intake modules disposed on opposite sides of the pump module.

4. The apparatus of claim 1, further comprising:
a cup disposed within the outlet channel to capture a portion of the outflow of the pump; and
a tubing attached to the cup configured for directing the captured outflow into the base portion of the enclosure.

5. The apparatus of claim 1, wherein the enclosure has a plurality of sides, each side having one or more inlet openings formed therein.

6. The apparatus of claim 1, wherein the at least one inlet opening has a weir notch formed therein.

7. The apparatus of claim 1, wherein the at least one inlet opening has a hinged inlet flap attached thereto.

8. An apparatus for removal of contaminants from water comprising:
an enclosure having one or more sidewalls extending to a base to define an interior, an openable lid and at least one inlet opening through the sides near the top configured for admitting water into the interior;
at least one intake module attached to an outer surface of the enclosure, the at least one intake module having a lower portion with an intake conduit extending into the base and an upper port on a first side of the intake module;
a grating removably supported above the base to define a space into which the intake conduit extends, the grating configured to prevent debris from entering the base;
a pump module attached to an outer surface of the enclosure adjacent to the at least one intake module, the pump module having a side port corresponding to the upper port of the at least one intake module, wherein the pump module and the at least one intake module are in fluid communication, the pump module further comprising an outlet channel;
a pump having a pump propeller disposed within the pump module at a location above the outlet channel;
a plurality of flotation devices attached to the outer surface of the enclosure;
a snorkel attached to the pump module, the snorkel having a lower end disposed adjacent the pump propeller and an upper end extending into air above a surface of the water, wherein rotation of the pump propeller generates a vacuum to draw air down into the snorkel; and
a fitting disposed below the pump propeller, the fitting in fluid communication with the base so that air is injected into the enclosure.

9. The apparatus of claim 8, further comprising:
a cup disposed within the outlet channel to capture a portion of the outflow of the pump; and
a tubing attached to the cup configured for directing the captured outflow into the base.

10. The apparatus of claim 8, wherein the one or more sidewalls comprises a plurality of sides, each side having one or more inlet openings formed therein.

11. The apparatus of claim 8, wherein the at least one inlet opening has a weir notch formed therein.

12. The apparatus of claim 8, wherein the at least one inlet opening has a hinged inlet flap attached thereto.

13. An apparatus for removal of contaminants from water comprising:
an enclosure having sides, a bottom portion, an openable lid and at least one inlet opening through the sides near the top configured for admitting water into the interior of the enclosure;
two intake modules attached to an outer surface of the enclosure, each intake module having a lower portion with an intake conduit in fluid connection with the bottom portion of the enclosure and an upper port on a first side of the intake module;
a pump module attached to an outer surface of the enclosure between the two intake modules, the pump module having a pair of side ports corresponding to the upper port of each intake module so that the pump module and the intake modules are in fluid communication, the pump module further comprising an outlet channel;
a pump having a pump propeller disposed within the pump module at a location above the outlet channel;
a grating disposed near the bottom portion of the enclosure to define a space into which the intake conduit extends; and
a plurality of flotation devices attached to the outer surface of the enclosure.

14. The apparatus of claim 13, further comprising:
a snorkel attached to the pump module so that a lower end of the snorkel is disposed adjacent to the pump propeller and an upper end of the snorkel extends through a top of the pump module above a surface of the water, wherein rotation of the pump propeller generates a vacuum to draw air down into the snorkel; and
a fitting disposed below the pump propeller, the fitting in fluid communication with the bottom of the enclosure so that air is injected into the enclosure.

15. The apparatus of claim 13, further comprising:
a cup disposed within the outlet channel to capture a portion of the outflow of the pump; and
a tubing attached to the cup configured for directing the captured outflow into the bottom portion of the enclosure.

16. The apparatus of claim 13, wherein the enclosure has a plurality of sides, each side having an inlet opening formed therein.

17. The apparatus of claim 13, wherein the at least one inlet opening has a weir notch formed therein.

18. The apparatus of claim 13, wherein the at least one inlet opening has a hinged inlet flap attached thereto.

* * * * *